United States Patent Office

2,794,727
Patented June 4, 1957

2,794,727

METHOD AND COMPOSITION FOR THE TREATMENT OF SOIL

Keith C. Barrons, Midland, Mich., assignor to The Dow Chemical Company, Midland, Mich., a corporation of Delaware No Drawing. Application September 16, 1953, Serial No. 380,611

13 Claims. (Cl. 71—2.7)

The present invention relates to the treatment of soil and is particularly concerned with an improved method and composition for the stimulation of plant growth and for the control of soil-inhabiting life forms including invertebrate organisms and germinative seeds and emerging seedlings.

The concept of the chemical control of vegetation is of fairly recent origin. Beginning with the use of inorganic materials such as chlorates, arsenates, borax and salt, weed and vegetation control development has progressed through the phytotoxic petroleum products and dinitrophenols to the aryloxy-aliphatic acids and their salts and esters. One facet of the development has been concerned with the so-called "pre-emergence" type of weed control in which the toxic material is placed on or in the upper layers of the soil after the planting of the crop but prior to the emergence thereof. Here the agent comes in contact with and selectively stunts or kills the tender weed seedlings as they are emerging through the soil. However, such methods have had a limited use, since the desired crop plant must be resistant to the concentration of the toxic material introduced into the soil.

With non-resistant crop species, the farmer still is confronted with major problems of weed control. This is particularly true in the case of truck crops where expensive hand weeding is required. A further problem in the use of presently known weed control methods is presented by the seed or other organs of propagation of weed species which lie dormant below the zone treated with the toxic chemical. Under conventional crop management procedures, subsequent to an earlier "pre-emergence" treatment such seed may be brought near the surface of the soil where conditions are favorable for rapid germination and growth.

The introduction of chemical materials into the soil offers an excellent method for the control of various life forms and organisms found therein. However, the utilization of such a method has been most generally hampered by the limited variety of organisms against which most materials are effective. This means that soil which is infested with a variety of life forms must be subjected to multiple treatments with different toxicant materials in order to obtain the desired control. It would be desirable, for example to be able to treat soil with a single toxicant to free it of such diverse organisms as germinative seeds and emerging seedlings and invertebrate organisms including wireworms, nematodes, sugar beet nematodes and fungi.

It is an object of the present invention to provide a new method and composition for the fumigation of soil, including clay-type soils. A further object is to provide an improved method and composition for the suppression of the growth of undesirable vegetation. Another object is the provision of a new method and composition for the control of soil-dwelling invertebrate organisms such as fungi, wireworms, sugar beet nematodes and root-knot nematodes. An additional object is the provision of an improved method and composition for substantially freeing soil or growth media of germinative and germinant seeds prior to the planting of the crop. A further object is to provide a method for treating soil which will accomplish the stimulation of the growth of crops subsequently planted therein. Yet another object is the provision of a composition of matter as a growth medium which is temporarily sterilized with respect to the growth of seeds and invertebrate organisms. Another object is the provision of new compositions adapted to be employed in the treatment of soil. Other objects will become apparent from the following specification and claims.

According to the present invention it has been discovered that soil-inhabiting organisms such as fungi, wireworms, root-knot nematodes and sugar beet nematodes, and germinative seeds and emerging seedlings may be controlled by distributing propargyl bromide through soil. It has been further discovered that such distribution of or impregnation with propargyl bromide accomplishes changes in the soil which stimulate the growth and improve the growth characteristics of crops subsequently planted therein. For the control of invertebrate organisms, a parasiticidal amount of the bromide compound is employed, while for the control of germinative seeds and emerging seedlings the bromide compound is employed in a growth-inhibiting amount. Where improved growth characteristics and enhanced crop yields are concerned, the above amounts of the bromide compound induce soil changes effecting such improved and beneficial results. Thus, for example, crop plants raised on such fumigated soil have more luxuriant tops and roots and are of a greater total weight than those normally obtained from untreated soil.

Propargyl bromide is a mobile liquid boiling at about 89° C. at atmospheric pressure, somewhat soluble in many organic solvents and of low solubility in water, and is adapted to be readily and conveniently distributed in soil. Further, when so employed, the compound accomplishes a rapid control of invertebrate organisms and induces soil changes which improve the growth characteristics of crops later raised in the treated soil. In addition, the compound also suppresses the growth of soil-inhabiting germinative seeds and emerging seedlings. It is among the advantages of the present invention that these desirable and beneficial results are obtained in sand, silt and clay type soils. It is a further advantage that the compound, while sufficiently persistent to accomplish the desired effect upon soil-inhabiting life forms such as invertebrate organisms and germinant seeds and emerging seedlings, or to achieve the changes in the soil which accomplish improved growth characteristics, dissipates in a reasonable period of time. Yet another advantage is that the bromide compound permeates soil for a distance of several inches from the point of application depending upon the temperature, moisture content, compactness and physical consistency of the soil or growth media.

The term "seed" is employed in the present specification and claims in its broad agricultural meaning and is inclusive of any propagative portion of a plant, including true seeds and seed-like fruits, and tubers, bulbs, etc. The term "growth media" is employed in its broadest sense to be inclusive of all conventional "soils," as defined in Webster's New International Dictionary, second edition, unabridged, published in 1937 by G. and C. Merriam Company, Springfield, Massachusetts. Thus, the term refers to any substance or medium in which vegetative organisms may take root and grow, and is intended to include not only earth but also compost, manure, muck, sand and the like, adapted to support plant growth.

The distribution of at least a minimum effective dosage of propargyl bromide in soil is essential for the practice of the present invention. In general, good controls of invertebrate organisms are obtained when the compound is distributed in the soil in the amount of from about 3 to 160 parts or more by weight per million parts by weight of soil. For the control of the growth of germinative seeds and emerging seedlings, good results are obtained when the bromide compound is distributed through soil in the amount of from about 12 to 160 parts or more per million parts by weight of soil, the exact dosage depending upon the vegetation type concerned and also upon the state of development of the seedlings. Where improved growth characteristics of crops are concerned, these same concentrations are particularly effective, although lower concentrations are sometimes effective.

In field applications, the bromide compound may be distributed in the soil at a dosage of from about 5 to 200 pounds or more per acre, and through such a cross-section of the soil as to provide for the presence therein of an effective concentration of the treating agent. In such applications, it is desirable that the compound be distributed to a depth of at least 2 inches. When the treatment is carried out by injection or drilling technique, it is preferred that the maximum distance between deposits be not materially in excess of 20 inches when the dosage is 20 pounds or more of toxicant per acre, and not materially in excess of 10 inches when the dosage is 5 pounds per acre, such maximum distance between deposits being directly proportional to the dosage of propargyl bromide within the extremes recited.

The method of the present invention may be carried out by distributing the unmodified propargyl bromide through the growth media as by impregnating or fumigating. However, the present method also embraces the employment of a liquid or dust composition containing the toxicant. In such usage, the bromide compound may be modified with one or a plurality of additaments including solvents or other liquid carriers, dispersing and emulsifying agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the bromide compound in the soil conveniently may be supplied per acre treated in from 5 to 13,000 gallons or more of the liquid carrier or in from about 50 to 1000 pounds of the solid carrier.

The exact concentration of the bromide compound to be employed in compositions for the treatment of soil may vary provided the required dosage of effective agent is supplied. The concentration of toxicant in liquid compositions employed to supply the desired dosage generally is from about 0.1 to 50 percent by weight or higher. In dusts, the concentration of toxicant may be from about 6 to 20 percent by weight. In compositions to be employed as concentrates, the toxicant may be present in a concentration of from about 10 to 95 percent by weight.

Liquid compositions containing the desired amount of the bromide compound may be prepared by dissolving the toxicant in an organic liquid such as acetone, toluene, methylene chloride, chlorobenzene and petroleum distillates, or by dispersing the toxicant in water with the aid of a suitable dispersing and emulsifying agent. In soil, the preferred organic solvent carriers are those which are adapted to accomplish the penetration and impregnation of the soil with the bromide compound and are of such volatility that they evaporate from the soil and leave little permanent residue therein.

The aqueous compositions to be employed in the present method may contain one or more water-immiscible solvents for the bromide compound. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the bromide compound in the aqueous carrier to produce the desired fumigant composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

A preferred embodiment of the invention consists of a petroleum distillate solution of the bromide compound. The petroleum distillates to be employed in such embodiment are carefully cut portions boiling almost entirely under 400° F. at atmospheric pressure, having a flash point above about 80° F., and leaving very small residues on evaporation. These fumigant compositions are characterized by having excellent penetrating properties and by being of low fire hazard to the shipper and user.

In the preparation of dust compositions, the bromide compound is dispersed in and on a finely divided material such as pyrophyllite, attapulgite, chalk, talc, fuller's earth or bentonite. In such operations, the finely divided carrier is mixed or wet with the bromide compound or a volatile organic solvent solution thereof.

In another preferred embodiment, the bromide toxicant is dispersed on and in an exploded mica to produce compositions and adapted particularly to be employed in fumigation operations where a gradual and prolonged release of the toxicant is desired. In preparing such compositions, a coarsely sub-divided mica carrier is mixed or wet with the bromide compound and the resulting product thereafter packaged in air-tight containers to prevent loss of toxicant by volatilization prior to use. In compositions employed to supply the desired dosage, suitable proportions of toxicant are from about 1 to 4 times the weight of the mica carrier.

A further preferred embodiment of the present invention is a novel composition comprising soil in admixture with an effective concentration of propargyl bromide.

When operating in accordance with the present invention, the soil may be impregnated with the bromide compound or a composition containing the toxicant, in any convenient fashion, e. g. by simple mixing with the soil, by employing a liquid carrier to accomplish the penetration and impregnation, or by injection or drilling techniques whereby the toxicant is deposited beneath the surface of the soil. Where injection or drilling techniques are concerned, the soil may be blanketed to suppress the volatilization of fumigant therefrom. In general, it is desirable that the distribution be carried out at a soil temperature of 45° F. or higher since the effectiveness of the bromide compound may be somewhat reduced at lower temperatures.

In a preferred embodiment, the method of the present invention is carried out in soil having a moisture content of from about 50 to 100 percent of the moisture equivalent of the soil. When operating under such soil conditions, maximum controls of germinant seeds and invertebrate organisms are obtained. Thompson, L. M. in Soils and Soil Fertility, McGraw Book Co. Inc. (1952) defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicant at a soil moisture content equal to the moisture equivalent. Following the distribution of the bromide compound, it is desirable that any planting operation not be carried out for a period of at least several days, the exact period depending upon the concentration of the bromide compound employed and the resistance of the species concerned to the bromide compound. Where minimum dosages are employed, as for example in sidedressing operations, existing mature vegetation of species resistant to the bromide compound are not unfavorably affected by the concentrations of the treating composition temporarily present in the soil.

The following examples illustrate the invention but are not to be construed as limiting the same:

Example 1

Propargyl bromide was dissolved in methylene chloride to produce a composition containing about 200 grams of the toxicant per liter of solution. This composition was employed for the treatment of a seed bed which had been prepared and seeded with the seeds of millet, carrot, tomato and lettuce. The treatment was accomplished by injection to distribute the propargyl bromide through the top 4 inches of soil, at a dosage of about 180 pounds of the toxicant per acre to give a concentration of about 140 parts by weight of the bromide compound per million parts by weight of soil. Another soil bed planted in a similar fashion was left untreated to serve as a check. The seed beds were subjected to overhead watering in an amount corresponding to about 4 inches of rainfall per month. On observation one month after the treatment, vigorously growing stands of the named plant species were found in the untreated checks, while no seedlings had emerged in the treated bed.

Example 2

Sandy loam soil was spread in flats about 6 inches deep and seeded with viable seeds of crab grass, purslane and pigweed. Several hours after planting, the propargyl bromide composition of Example 1 was injected into the soil to distribute the toxicant through the top 4 inches of soil at a dosage of about 200 pounds per acre. The distribution was at a concentration of about 156 parts by weight of the bromide compound per million parts by weight of soil. Following the treatment, the treated flats and a similarly seeded but untreated flat were placed in a cold room at 50° F. to suppress the germination of the seed and to permit the propargyl bromide to act against the dormant but viable seed. After 48 hours in the cold room, the flats were removed and thereafter exposed to conventional greenhouse conditions of light, temperature and humidity. The flats were subjected to overhead watering in the amount of about 4 inches of rainfall per month. About three weeks later, the treated flats were examined and a 100 percent control of germination and emergence observed for all seed species. In contrast, the check flat was found to support a luxuriant stand of the named plant species.

Example 3

Propargyl bromide was dissolved in a petroleum hydrocarbon fraction boiling at from about 312°–390° F. (Stoddard Solvent) to obtain a composition containing about 100 grams of toxicant per liter of solution. This composition was injected into a plot of sandy loam soil containing a heavy population of nut grass tubers. The application was carried out so as to distribute the propargyl bromide through the top 4 inches of soil at a dosage of 211 pounds per acre. This distribution was at a concentration of about 165 parts by weight of the bromide compound per million parts by weight of soil. Observations one month after the treatment showed a 95 percent control of nut grass tubers in the treated area in comparison with and based upon the emergence of nut grass tubers in an untreated check area.

Example 4

Ten parts by weight of propargyl bromide is intimately mixed with 10 parts by weight of a dimeric alkylated aryl polyether alcohol (Triton X–155) and the resulting composition thereafter dispersed in water to prepare a composition containing about 100 pounds of propargyl bromide per 200 gallons of the ultimate mixture. The latter composition, while under agitation, is metered into irrigation water at pump outlet at the rate of about two gallons per 100 gallons of the irrigation water. The water is in a state of turbulent flow as it comes from the pump, which provides for thorough mixing of the toxicant composition therein. The irrigation is carried out in conventional fashion and approximately ½ acre inch of water is applied to the land to accomplish the wetting of the soil to about a 5 inch depth. This treatment accomplishes a good control of the germination and emergence of undesirable weed seeds. Three weeks after the treatment, cauliflower is seeded in the treated soil. The resulting stand of cauliflower plants develops normally and substantially without competition from noxious vegetation other than that attributable to reinfection of the treated soil by wind-borne seeds.

Example 5

Twenty-five parts by weight of propargyl bromide, 65 parts of xylene and 10 parts of an alkyl aryl sulfonate (Acto 700) were mechanically mixed together to obtain a concentrate composition in the form of an emulsifiable liquid. This concentrate composition was thereafter dispersed in water to produce an aqueous emulsion composition containing about 2 pounds of propargyl bromide per 100 gallons of composition.

In a further operation, 50 parts by weight of propargyl bromide, 45 parts of deodorized kerosene and 5 parts of an alkyl sulfonate (Alkanol WXN) were mixed together and the resulting concentrate dispersed in water to produce an aqueous emulsion composition containing about 4 pounds of propargyl bromide per 100 gallons of composition.

In a similar manner, an aqueous emulsion composition containing about 4 pounds of toxicant per 100 gallons of composition was prepared from a concentrate composition comprising 50 parts by weight of propargyl bromide, 45 parts of xylene and 5 parts of Triton X–155.

These aqueous compositions may be employed to irrigate the soil and distribute the propargyl bromide therein in concentration sufficient temporarily to sterilize the soil so as to control various soil organisms and prevent the growth of seeds present in the soil.

Example 6

Propargyl bromide was dissolved in a low boiling petroleum hydrocarbon fraction (Stoddard's solvent) to produce a fumigant composition having a flash point greater than 100° F. and containing about 10 grams of toxicant per 97 milliliters of solution. The hydrocarbon solvent had a boiling range of from about 312° to 390° F. and a flash point of about 116° F. This composition was employed for the treatment of soil which had been heavily seeded with timothy and tampala. In such operations, the soil was placed in sealable containers and thereafter separately treated with the fumigant composition in an amount sufficient to supply concentrations of about 79, 39 and 14 parts by weight of propargyl bromide per million parts by weight of soil. The containers of treated soil were then sealed and set aside at a temperature of about 25° C. In a check operation, sealed containers containing soil seeded with the named plant species were exposed to the same conditions as the containers containing the treated soil.

After two days, the containers were unsealed, and the treated and untreated soil separately spread in seed beds about 2 inches deep, and the beds thereafter exposed to conventional greenhouse conditions of light, temperature and humidity. About 2 weeks later, the treated beds were examined. 100 percent control of germination and emergence was observed for both seed species in all soil samples treated with propargyl bromide. In contrast, the check beds were found to have developed vigorously growing stands of the named plant species.

*Example 7*

Progargyl bromide was dissolved in acetone to produce a fumigant composition containing 94 grams of the bromide compound per liter of ultimate mixture. This composition was employed for the treatment of a seed bed containing a sandy loam soil which was heavily infested with root knot nematodes. At the time of treatment, the soil had a moisture content of about 8 percent. This moisture content is about 80 percent of the moisture equivalent or field capacity of the soil. The distribution was accomplished by injecting the fumigant solution into the soil in rows 12 inches apart, the injections being made at 4 inch intervals and at a depth of about 6 inches below the soil surface. The amount of fumigant employed was sufficient to supply 9.4 pounds of propargyl bromide per acre. The latter dosage corresponds to a concentration of about 3.2 parts by weight of propargyl bromide per million parts by weight of soil. Following the application, the average soil temperature remained at about 62° F. for the period of determination.

Ten days after treatment the soil was seeded with tomatoes, the seeded soil being that positioned about 6 inches from the loci of treatment. Untreated check plots were also planted with tomato seeds. During the growing period, there was observed no adverse effect upon the germination and growth of seedlings attributable to the presence of residual fumigant. About 5 weeks after seedings, the plants were lifted from the soil, and the roots washed and examined for gall formation attributable to nematode attach. The examination of the plants indicated a substantially complete control of nematodes in the treated soil with heavy infestation in the check plots.

*Example 8*

In an exactly comparable operation, beds of nematode-infested sandy loam soil were separately treated with acetone solutions containing 500, 325, 250 and 188 grams of propargyl bromide per liter of ultimate mixture and at dosages of 50, 37.5, 25, and 18.8 pounds, respectively, of toxicant per acre. These dosages correspond, respectively, to concentrations of about 17.0, 13, 8.6 and 6.5 parts of propargyl bromide per million parts by weight of soil. At the time of treatment, the soil had a moisture content of about 9 percent, the latter being about 80 percent of the moisture equivalent or field capacity of the soil. Following the treatment, the average soil temperature remained at about 62° F. for the period of the determination.

About 2 weeks after treatment, the soil was seeded with tomatoes, the seeded soil being that positioned approximately 6 inches from the loci of treatment. Untreated check plots were also planted with tomato seeds. During the growing period there was observed no adverse effect upon the germination and growth of seedlings attributable to the presence of resdual fumigant. About 5 weeks after seeding, the plants were lifted from the soil, and the roots washed and examined for gall formation attributable to nematode attack. The examination indicated that a 100 percent control of nematodes had been obtained in all soil plots which had been treated with propargyl bromide. In the check plots, the plants were found to be dwarfed and their roots covered with galls attributable to nematode attack.

*Example 9*

In a similar manner seed beds containing clay loam soil heavily infested with the cysts and larvae of sugar beet nematodes, were separately treated with acetone solutions containing 500 and 375 grams of propargyl bromide per liter of ultimate mixture and at dosages of 50 and 37.5 pounds, respectively, of toxicant per acre. These dosages correspond, respectively, to concentrations of about 17.0 and 13 parts by weight of propargyl bromide per million parts by weight of soil. At the time of treatment, the soil had a moisture content of about 12 percent, the latter being about 60 percent of the field capacity of the soil. Following the treatment, the average soil temperature remained at about 62° F. for the period of the determination.

About two weeks after treatment, the soil was seeded with rape, the seeded soil being that positioned about six inches from the loci of treatment. Untreated check plots are also planted with rape seeds. During the growing period there was observed no adverse effect upon the germination and growth of seedlings attributable to the presence of residual fumigant. About five weeks after seeding, the plants were lifted from the soil, their roots carefully washed and the latter examined microsopically in order to determine the presence of disease free plants. The examination indicated that a 100 percent kill of sugar beet nematode cysts and larvae had been obtained in the soil plots treated at the above-indicated dosages. In the check plots, the roots of the rape plants were found to be heavily infested with sugar beet nematodes.

*Example 10*

Propargyl bromide was employed for the treatment of sandy loam soil heavily infested with the fungus organisms *Fusarium solani, Pythium* and *Rhizoctonia solani*. In the treating operations, the soil was placed in sealable containers and separately injected with acetone solutions containing 15 and 3 grams of propargyl bromide per liter of ultimate mixture and in amounts sufficient to supply concentrations of 25 and 5 parts by weight, respectively, of propargyl bromide per million parts by weight of the soil. The containers of treated soil were incubated at an average temperature of about 25° C. In a check operation, sealed containers containing the above infested but untreated soil were exposed to the same conditions as the treated soil.

After three days, the containers were unsealed and portions of the treated and untreated soil cultured by the dilution plate method as described by Martin, J. P., in Soil Science, 69 No. 3, p. 215-32 (March 1950) to determine the percent control of fungal organisms. In the latter operations, the culturing medium employed was a peptone dextrose agar (1000 milliliters of water, 10 grams of dextrose, 5 grams of peptone, 1 gram of $KH_2PO_4$, 0.5 grams of $MgSO_4 \cdot 7H_2O$ and 20 grams of agar) containing 0.069 grams of rose bengal and 0.030 grams of streptomycin per liter of ultimate mixture. In the plating operations, the culturing medium was inoculated with about 0.5 gram of soil sample per liter of medium, and the plates thereafter poured in replicates of three for each of the treated and check soils. The poured plates were then incubated for three days at 25° C.

After incubation, the plates were examined and counts of fungal colonies made in order to determine the percent control of the test organisms. The examination showed that a 98 and 70 percent control of the fungal organisms had been obtained in the soil treated at concentrations of 25 and 5 parts by weight, respectively, of propargyl bromide per million parts by weight of the soil.

*Example 11*

A determination was carried out for the control of nematodes in which propargyl bromide was applied in a 40 percent by weight solution in Standard Thinner 250. The latter is a petroleum hydrocarbon fraction boiling at from about 190° to 272° F. The soil to be treated was heavily infested with sugar beet nematodes and consisted of a clay loam containing about 28 percent clay, 27 percent silt and 45 percent sand. At the time of treatment, the soil, which had a moisture equivalent of about 20 percent, contained about 14 percent by weight of water. In the treating operations, the fumigant composition was drilled into the soil in rows 12 inches apart and at a depth of about 7 inches below the soil surface. The amount of fumigant material employed was sufficient to supply 75 pounds of propargyl bromide per acre.

About 2 weeks after treatment, the field plot was seeded with sugar beets. Untreated check plots were also planted with sugar beet seeds. During the growing period there was observed no adverse effect upon germination and growth of seedlings attributable to the presence of residual fumigant. About ten weeks after seeding, plants were selected at random in the treated and untreated areas, lifted from the soil, the roots washed, and the plants weighed and thereafter examined in order to determine the presence or absence of disease. The examination indicated that a substantially complete control of sugar beet nematodes had been obtained in the treated soil. In the check plots, the plants were found severely dwarfed and stunted from the attack of sugar beet nematodes. When the plants were weighed, the average weight of the plants in the treated soil was found to be seven times greater than the average weight of the plants in untreated plots. When the plants were topped and their roots weighed, the average weight of the roots of the plants in the treated soil was found to be 11 times greater than the average weight of the roots of the plants in the untreated plots.

*Example 12*

In a further determination, propargyl bromide was similarly employed for the control of sugar beet nematodes in the clay loam soil type containing 14 percent by weight of moisture as described in Example 11. The composition employed and the treating and subsequent planting operations were all as described in the preceding example except that the fumigant composition was employed in an amount sufficient to supply 37.5 pounds of propargyl bromide per acre. During the following growing period, there was observed no adverse effect upon the germination and growth of seedlings attributable to the presence of residual fumigant.

About ten weeks after seeding, plants were selected at random in the treated and untreated field plots, such plants lifted from the soil, the roots washed and the plants weighed and thereafter examined in order to determine the presence of disease-free plants. The examination indicated that a substantially complete control of nematodes had been obtained in the treated soil with the plants in the check plots being severely dwarfed and stunted from the attack of sugar beet nematodes. When the plants were weighed, the average weight of the plants in the treated soil was found to be about 6 times greater than the average weight of the plants in the untreated plots. When the plants were topped and their roots weighed, the average weight of the roots of the plants in the treated soil was found to be 9 times greater than the average weight of the roots of the plants in the untreated plots.

*Example 13*

The fumigant composition as described in Example 6 is employed for the treatment of one-half of a field containing a sandy loam soil. The treatment is carried out by drilling technique whereby the fumigant mixture is introduced at a depth of about 6 inches and in rows spaced about 10 inches apart. The amount of fumigant composition employed is sufficient to supply about 25 pounds of propargyl bromide per acre. At the time of treatment, the soil has a moisture content of about 10 percent, the latter being the approximate field capacity of the soil.

Two weeks after treatment, the entire field is seeded to carrots. During the growing period there is observed no adverse effect upon the germination and growth of the crop attributable to the presence of residual fumigant. Toward the end of the growing season, the foliage and tops of the carrot plants in the treated portion of the field are observed to be more lush and bountiful than those in the untreated plots. At harvest, the yield of carrots taken from the treated soil is found to be substantially greater than that from the untreated soil.

*Example 14*

In another operation, beds of sandy loam soil which were heavily infested with root knot nematodes, were separately treated with acetone solutions containing 200 and 100 parts by weight of propargyl bromide per liter of ultimate mixture and at dosages of 20 and 10 pounds, respectively, of toxicant per acre. At the time of the treatments, the soil had a moisture content of about 8.5 percent, the latter being about 80 percent of the field capacity of the soil. The distribution was accomplished by injecting the composition into the soil in rows spaced at various distances apart, the injections being made at 4 inch intervals and at a distance of about 6 inches below the soil surface. Following the applications, the average soil temperature remained at about 62° F. for the period of the determination.

About one week after treatment, the soil was seeded with tomatoes, the seeded soil being that positioned a distance from the loci of treatment equal to one-half the spacing between injection rows. Untreated check plots were also planted with tomato seeds. During the growing period there was observed no adverse effect upon the growth of seedlings attributable to the presence of residual fumigant. About four weeks after seeding, the plants were lifted from the soil, the roots washed and the latter examined for gall formation attributable to nematode attack. The percentage controls of nematodes obtained at the employed dosages and at the employed injection-row spacings are set forth in the following table:

| Distance Between Rows of Injection | Percent Control of Root-Knot Nematodes | |
| --- | --- | --- |
|  | 20 Pounds Per Acre | 10 Pounds Per Acre |
| 14 inches | 100 | 94 |
| 16 inches | 100 | 81 |
| 18 inches | 99 |  |

*Example 15*

Sandy loam soil was separately treated with acetone solutions containing 25 and 12.5 parts by weight of propargyl bromide per liter of ultimate mixture and at dosages of 25 and 12.5 pounds, respectively, of toxicant per acre-foot of soil. These dosages correspond, respectively, to concentrations of about 5.7 and 2.8 parts by weight of propargyl bromide per million parts by weight of soil. In such operations, the soil was placed in sealable containers and the soil in each container thereafter separately injected with the fumigant composition at the above-indicated dosages. The containers of treated soil were then sealed and incubated at an average temperature of about 25° C.

After two days, the containers were unsealed and allowed to aerate for about a week and the treated soil thereafter seeded to tomatoes. In a check operation, steam-sterilized soil was seeded with tomatoes. About one month after seeding, the plants were lifted from the soil, the roots separated from the above-ground portion of the plants and the latter weighed. As a result of these de-aerial portions of the plants from the soil treated at dosages of 25 and 12.5 pounds of toxicant per acre-foot were 69 and 43 percent, respectively, greater than the average weight of the aerial portions of the plants from the steam-sterilized soil.

This is a continuation in part of my copending application Serial No. 307,168, filed August 29, 1952 and now abandoned.

I claim:

1. A method for controlling soil-dwelling nematodes and fungi which comprises impregnating soil with a parasiticidal amount of propargyl bromide.

2. A method for suppressing the growth of seeds and emerging seedlings in soil and related growth media which comprises impregnating the soil with a growth-inhibiting amount of propargyl bromide.

3. A method which comprises impregnating soil with propargyl bromide in the amount of at least 3 parts by weight per million parts by weight of soil.

4. An agronomical practice which comprises impregnating soil with a composition made up of propargyl bromide as an active ingredient uniformly associated with an inert diluent as a carrier therefor, the impregnation being carried out so as to provide at least 3 parts by weight of the bromide compound per million parts by weight of soil.

5. A method as claimed in claim 4 wherein the soil is impregnated with a composition comprising a petroleum distillate solution of propargyl bromide.

6. In the practice of agricultural economy, a method which comprises impregnating field soil with propargyl bromide at a substantially uniform dosage of at least 5 pounds per acre, the impregnation being carried out through such a cross-section of the soil as to provide for the presence therein of at least 3 parts by weight of the bromide compound per million parts by weight of soil.

7. A method claimed in claim 6 wherein the soil at the time of treatment with the bromide compound has a moisture content of from 50 to 100 percent of the moisture equivalent of said soil.

8. A method which comprises distributing propargyl bromide in soil to a depth of at least 2 inches below the soil surface and at a rate of at least 5 pounds per acre, the propargyl bromide being so distributed that the maximum distance between deposits is not in excess of 10 inches when the dosage is about 5 pounds per acre and not in excess of 20 inches when the dosage is at least 20 pounds per acre, such maximum distance between deposits being directly proportional to the dosage of propargyl bromide within the extremes recited.

9. A composition comprising at least 6 percent by weight of propargyl bromide in intimate association with an inert finely divided solid as a carrier therefor.

10. A composition comprising at least 0.1 percent by weight of propargyl bromide in intimate association with a liquid solution of an emulsifying and dispersing agent as a carrier therefor.

11. A composition comprising a petroleum distillate solution of propargyl bromide, the bromide compound being present in the composition in the amount of at least 0.1 percent by weight.

12. A concentrate composition comprising at least 10 percent by weight of propargyl bromide in intimate association with an emulsifying and dispersing agent.

13. A method for stimulating the growth of crop plants which comprises impregnating soil with propargyl bromide in the amount of at least 3 parts by weight per million parts by weight of soil and thereafter planting the treated soil with the desired crop plant.

References Cited in the file of this patent

UNITED STATES PATENTS

| | | |
|---|---|---|
| 2,435,204 | Davidson | Feb. 3, 1948 |
| 2,448,265 | Kagy | Aug. 31, 1948 |

FOREIGN PATENTS

Henbest et al.: "Researches on Acetylenic Compounds. Part XXI . . . Propargyl Bromides." Published 1949 in London, England, in Journal of the Chemical Society, vol. 1949, part 3, pages 2696 through 2700.

UNITED STATES PATENT OFFICE

CERTIFICATE OF CORRECTION

Patent No. 2,794,727

June 4, 1957

Keith C. Barrons

It is hereby certified that error appears in the printed specification of the above numbered patent requiring correction and that the said Letters Patent should read as corrected below.

Column 6, line 41, for "smulsion" read --emulsion--; column 7, line 38, for "attach" read --attack--; line 64, for "resdual" read --residual--; column 9, line 71, for "pounds of" read pounds--; column 10, line 70, after "de-" insert --terminations, it was found that the average weight of the--.

Signed and sealed this 22nd day of October 1957.

(SEAL)
Attest:

KARL H. AXLINE

Attesting Officer

ROBERT C. WATSON
Commissioner of Patents